United States Patent
Allen et al.

(10) Patent No.: US 9,860,112 B2
(45) Date of Patent: Jan. 2, 2018

(54) TECHNIQUES FOR SYNCHRONIZING OPERATIONS BETWEEN REGIONS WHEN A NETWORK CONNECTION FAILS

(71) Applicant: INTERNATIONAL BUSINESS MACHINES CORPORATION, Armonk, NY (US)

(72) Inventors: Gerald Martyn Allen, Hursley (GB); Michael David Brooks, Hursley (GB); Jenny Jing He, Hursley (GB); Philip Ivor Wakelin, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 14/790,347

(22) Filed: Jul. 2, 2015

(65) Prior Publication Data
US 2016/0006603 A1    Jan. 7, 2016

(30) Foreign Application Priority Data

Jul. 2, 2014 (GB) .................................. 1411823.6

(51) Int. Cl.
*H04L 12/24* (2006.01)
*H04L 12/703* (2013.01)

(52) U.S. Cl.
CPC .......... *H04L 41/0668* (2013.01); *H04L 45/28* (2013.01)

(58) Field of Classification Search
None
See application file for complete search history.

(56) References Cited

U.S. PATENT DOCUMENTS

| 5,319,774 A | 6/1994 | Ainsworth et al. |
| 5,327,532 A | 7/1994 | Ainsworth et al. |
| 5,893,128 A * | 4/1999 | Nauckhoff ............. G06F 9/466 715/210 |

(Continued)

OTHER PUBLICATIONS

IBM, "CICS Recovery Manager", IBM Knowledge Center, CICS Transaction Server 3.1.0, downloaded Mar. 1, 2014—URL:https://publib.boulder.ibm.com/infocenter/cicsts/v3r1/index.jsp?topic=%2Fcom.ibm.cics.ts31.doc%2Fdfht2%2Fdfht25q.htm.

(Continued)

*Primary Examiner* — Gregory Sefcheck
(74) *Attorney, Agent, or Firm* — Michael R. Long; Parashos Kalaitzis (57) ABSTRACT

A technique for synchronizing operations in a transaction processing system includes identifying, by a first recovery management connector (FRMC) in a first region, a failure of a first network connection having a first network type during synchronization operations with a partner region. The FRMC queries connections defined to the transaction processing system to identify a replacement network connection that is connected to the partner region using a second network type that is different than the first network type. The FRMC collects relevant data for an interrupted synchronization operation. The FRMC issues a command to link to a specific program in a FRMC in the partner region. The command includes the relevant data for the interrupted synchronization operation. A second recovery management connector of the first region communicates the command to and a response from the partner region via the replacement network connection in order to continue the interrupted synchronization operation.

20 Claims, 6 Drawing Sheets

(56) References Cited

U.S. PATENT DOCUMENTS

| | | | | |
|---|---|---|---|---|
| 7,281,031 | B1* | 10/2007 | Wang | H04L 12/00 709/203 |
| 7,286,489 | B2* | 10/2007 | Ades | H04L 41/0806 370/254 |
| 7,633,857 | B2* | 12/2009 | Fujii | H04L 12/4637 370/223 |
| 7,733,797 | B2* | 6/2010 | Ades | H04L 41/0806 370/252 |
| 8,112,661 | B1* | 2/2012 | La France | G06F 11/2069 714/42 |
| 8,248,913 | B1* | 8/2012 | Liu | H04L 45/22 370/216 |
| 8,326,971 | B2 | 12/2012 | Dickerson et al. | |
| 8,606,833 | B2 | 12/2013 | Hickson | |
| 8,767,547 | B2* | 7/2014 | Adams | H04L 12/5695 370/230 |
| 2002/0138604 | A1* | 9/2002 | Kopelovitz | H04L 41/0803 709/223 |
| 2004/0044799 | A1 | 3/2004 | Sivaraman et al. | |
| 2005/0278397 | A1* | 12/2005 | Clark | G06F 11/1458 |
| 2008/0270832 | A1* | 10/2008 | Sethi | G06F 11/1443 714/18 |
| 2008/0301492 | A1 | 12/2008 | Honda et al. | |
| 2013/0268357 | A1* | 10/2013 | Heath | H04L 63/00 705/14.53 |
| 2015/0186202 | A1* | 7/2015 | Wang | H04L 45/04 714/57 |

OTHER PUBLICATIONS

Philip A. Bernstein Digital Equipment Corp., "Transaction Processing Monitors", Cambridge, MA Date: Nov. 11, 1990—URL: http://dl.acm.org/citation.cfm?id=92767.

IP.com Prior Art Database Disclosure, "Method for Synchronizing Tasks Across Multiple Systems" IP.com Disclosure No. IPCOM000207362D Publication Date: May 27, 2011—URL: http://ip.com/IPCOM/000207362.

* cited by examiner

TECHNIQUES FOR SYNCHRONIZING OPERATIONS BETWEEN REGIONS WHEN A NETWORK CONNECTION FAILS

This application claims priority to United Kingdom Patent Application 1411823.6, entitled "SYNCHRONIZING OPERATIONS BETWEEN REGIONS WHEN A NETWORK CONNECTION FAILS," filed on Jul. 2, 2014. The disclosure of United Kingdom Patent Application 1411823.6 is hereby incorporated herein by reference in its entirety for all purposes.

BACKGROUND

This application is generally directed to synchronizing operations and, more particularly, to techniques for synchronizing operations between regions when a network connection fails.

Online transaction processing (OLTP) monitors support the concurrent execution of large numbers of instances of user transactions, known as tasks. These tasks can access the resources the OLTP monitor controls using an application programming interface (API) that the OLTP monitor provides. A user application program run by such a task can then issue API commands that the OLTP monitor then tries to satisfy. However, not all of the resources that an OLTP monitor controls may reside in a same region and often network connections are used to transmit an API command over a network to another OLTP monitor region.

Network messages have to conform to the protocol that a particular network supports. An OLTP monitor provides components that construct messages so that the messages conform to a specific network protocol, and which then interprets messages that arrive over a network for processing by the monitor. Several network connections can be supported between a pair of OLTP monitors, each using its own message protocol, to provide resilience to failure, or which support the transmission of different sets of API commands.

A user task can carry out updates to resources that are controlled by an OLTP monitor that it is running within, and also with those that have been accessed across a network in another OLTP monitor. Some tasks require that, before they end, all of these updates are kept in step with each other, and an OLTP monitor, such as CICS TS for z/OS (CICS is a trademark of International Business Machines Corporation), offers services to synchronize the set of updates that an individual task carries out. This process is referred to as 'syncpointing' in the CICS TS for z/OS Information Centre.

Specific components, often called recovery management connectors (RMCs), are used by OLTP monitors to handle the network messages that are exchanged during synchronizing operations. The components contain logic that links together the identity of a user task that is in the processing of carrying out synchronizing operations, the point in the synchronizing operation sequence that has been reached at any point in time, and the connection resources that the user task is making use of.

If the network connection fails during synchronizing operations then the OLTP monitors retain information on any tasks that they were in the process of synchronizing, so that the tasks can be completed once connectivity has been restored. Other tasks that start after a connection fails can make use of an alternative connection to the same partner OLTP monitor, but those that failed during synchronizing operations processing are prevented from doing so.

The interdependencies between a user task, the connection resources allocated to it, and the network protocol make it difficult to continue with the synchronizing operation when a connection of another type is available between the same pair of monitors, in much the same way that a driver that is used to access an Information Management System (IMS) database cannot be used to complete DB2 updates should the DB2 driver fail.

User tasks that cannot complete a synchronizing operation immediately may then retain locks on the resource updates that need to be finalized, preventing other user tasks from carrying out further changes to those resources.

BRIEF SUMMARY

Disclosed are a method, a data processing system, and a computer program product (embodied in a computer-readable storage device) for synchronizing operations between regions when a network connection fails.

A technique for synchronizing operations in a transaction processing system (including first and second recovery management connectors in a first region) includes identifying, by the first recovery management connector, a failure of a first network connection having a first network type during synchronization operations with a partner region. The first recovery management connector queries connections defined to the transaction processing system to identify a replacement network connection that is connected to the partner region using a second network type that is different than the first network type. The replacement network connection utilizes the second recovery management connector. The first recovery management connector collects relevant data for an interrupted synchronization operation. The first recovery management connector issues a command to link to a specific program in a first recovery management connector in the partner region. The command includes the relevant data for the interrupted synchronization operation. The second recovery management connector communicates the command to and a response from the partner region via the replacement network connection in order to continue the interrupted synchronization operation.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, data processing system, and a computer program product (embodied in a computer-readable storage device) for synchronizing operations between regions when a network connection fails.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices.

Techniques are disclosed for synchronizing updates to distributed applications in a transaction processing system when a network connection fails by using a different network protocol to complete synchronization operations. Synchronization points may be used to divide a task into smaller logical units of work. Each synchronization point command establishes a point to mark the completion of a unit of work and, unless a rollback option is specified, causes all changes to be committed to recoverable resources that have been made by the task since its last synchronization point.

The disclosed method and system may be implemented as extensions to a recovery management connector (RMC) as part of an online transaction processing (OLTP) monitor of a transaction processing system, so that the RMC reacts to the failure of a connection that it has been managing. The RMC then looks to see if there is an alternative route to the partner region it was connected to, and if one is not found then causes any updates to tasks that are being synchronized to be held until the connection can be restored. However, if an alternative connection is found then the RMC gathers together essential data about any user tasks that were part of a synchronization operation at the time of the failure and, using API commands provided by the OLTP monitor that it is part of, transfers the data over the alternative connection to its counterpart RMC in the partner region. In various embodiments, this involves the use of a separate RMC for the alternative connection than is then being used. The RMC may be unaware of the nature of the data that it transmits through the network.

When a message arrives in the remote OLTP monitor the command is rebuilt and issued in that region. This causes a new component of the failed connection's RMC to be invoked and gain access to the data associated with the command. This permits the RMC to continue to process the synchronization operation for a task allowing it to complete normally, and in doing so to release any locks it is holding on the updates it has carried out. The disclosed techniques concern the processing that takes place once an RMC has detected or been notified of a failure with the network connection it is using, and where a second connection is available for it to use.

According to one method of the present disclosure, a first recovery management connector at a first region of a transaction processing system is configured for: identifying a failure of a network connection during synchronization operations with a partner region; querying connections defined to the transaction processing system to identify a replacement network connection that is connected to the partner region using a different network type to the failed network connection (the replacement network connection having a second recovery management connector in the first region); collecting relevant data for an interrupted synchronization operation; issuing a command to link to a specific program at a first recovery management connector in the partner region (the command including the relevant data for the interrupted synchronization operation); and using the second recovery management connector at the first region to communicate the command and a response from the partner region via the replacement network connection in order to continue the interrupted synchronization operation.

The second recovery management connector of the first region may be configured for: processing the command to package it in a protocol of the network type of the replacement network connection at an application layer; and transmitting the packaged command to the partner region using the replacement network connection. A second recovery management connector in the partner region may be configured for: receiving the packaged command; and extracting the command and issuing the command in the partner region. The first recovery management connector in the partner region may be configured for running the specific program linked to by the command; using the relevant data for the interrupted synchronization operation to locate state information about the synchronization operation in the partner region; combining the received relevant data and the state information at the partner region to determine how to continue the synchronization operation; and building a response to the command.

The second recovery management connector in the partner region may be configured for: packaging the response in the protocol of the network type of the replacement network connection; and transmitting the packaged response to the first region using the replacement network connection. The second recovery management connector in the first region may be configured for: receiving the packaged response; and extracting the response and delivering it to the first recovery management connector in the first region. The first recovery management connector in the first region may also be configured for completing a current section of the synchronization operation to ensure the first region and the partner region are synchronized.

Collecting relevant data for an interrupted synchronization operation may include collecting a user task identifier and the synchronization state. A synchronization operation may require a message sequence and issuing a command to link to a specific program may include a sequence of commands each containing data to a particular phase in the operation. A synchronization operation may be servicing at least one user application and collecting relevant data may collect the relevant data from one or more user applications. The first recovery management connector at a first region and the first recovery management connector in the partner region may both identify a failure and issue a command for delivery via a replacement network connection. A command may be failed based on a preference factor between the first region and the partner region.

According to another aspect of the present disclosure a system for synchronizing operations at a transaction processing system comprises a first region of the transaction processing system that includes: a first recovery management connector managing requests using a first network connection to a partner region; and a second recovery management connector managing requests using a second network connection of different type to the partner region. The first recovery management connector may include: a connection failure component for identifying a failure of a network connection during synchronization operations with a partner region; a replacement network connection component for querying connections defined to the transaction processing system to identify a replacement network connection that is connected to the partner region using a different network type to the failed network connection (the replacement network connection having a second recovery management connector in the first region); a data collection component for collecting relevant data for an interrupted synchronization operation; and a command component for issuing a command to link to a specific program at a first recovery management connector in the partner region (the command including the relevant data for the interrupted synchronization operation).

The second recovery management connector may include: a communication component for communicating the command and a response from the partner region via the replacement network connection in order to continue the interrupted synchronization operation. The second recovery management connector of the first region may also include: a command processing component for processing the command to package it in a protocol of the network type of the replacement network connection at an application layer; and a communication component for transmitting the packaged command to the partner region using the replacement network connection. The system may include a second recovery management connector in the partner region that includes: a communication component for receiving the packaged command and extracting the command and issuing the command in the partner region. The first recovery management connector in the partner region may also include: the specific program linked to by the command in the partner region; a response generating component for using the relevant data for the interrupted synchronization operation to locate state information about the synchronization operation in the partner region, combining the received relevant data and the state information at the partner region to determine how to continue the synchronization operation, and building a response to the command.

The communication component of the second recovery management connector in the partner region may be configured to: package the response in the protocol of the network type of the replacement network connection; and transmit the packaged response to the first region using the replacement network connection. The communication component of the second recovery management connector in the first region may be configured to: receive the packaged response; and extract the response and deliver it to the first recovery management connector in the first region. The first recovery management connector in the first region may include: a completing component for completing a current section of the synchronization operation to ensure the first region and the partner region are synchronized. The data collection component for collecting relevant data for an interrupted synchronization operation may include collecting a user task identifier and the synchronization state. The first recovery management connector at a first region and the first recovery management connector in the partner region may include: a conflict component for resolving a situation where both identify a failure and issue a command for delivery via a replacement network connection; and the conflict component failing one command based on a preference factor between the first region and the partner region.

According to yet another aspect of the present disclosure a computer-readable storage medium includes computer-readable program code embodied thereon that, when executed, synchronizes operations in a transaction processing system. In at least one embodiment, the computer-readable program code is configured at a first recovery management connector at a first region of the transaction processing system to: identify a failure of a network connection during synchronization operations with a partner region; query connections defined to the transaction processing system to identify a replacement network connection that is connected to the partner region using a different network type to the failed network connection, the replacement network connection having a second recovery management connector in the first region; collect relevant data for an interrupted synchronization operation; issue a command to link to a specific program at a first recovery management connector in the partner region (the command including the relevant data for the interrupted synchronization operation); and use the second recovery management connector at the first region to communicate the command and a response from the partner region via the replacement network connection in order to continue the interrupted synchronization operation.

Aspects of the disclosure provide the advantage of enabling a synchronization operation to complete using an alternative network protocol before an original network is restored. More specifically, aspects of the disclosure provide a way of using services provided by one RMC to communicate actions of another RMC between a pair of systems, allowing a synchronizing operation to complete before an original network is restored.

Figure 1A:
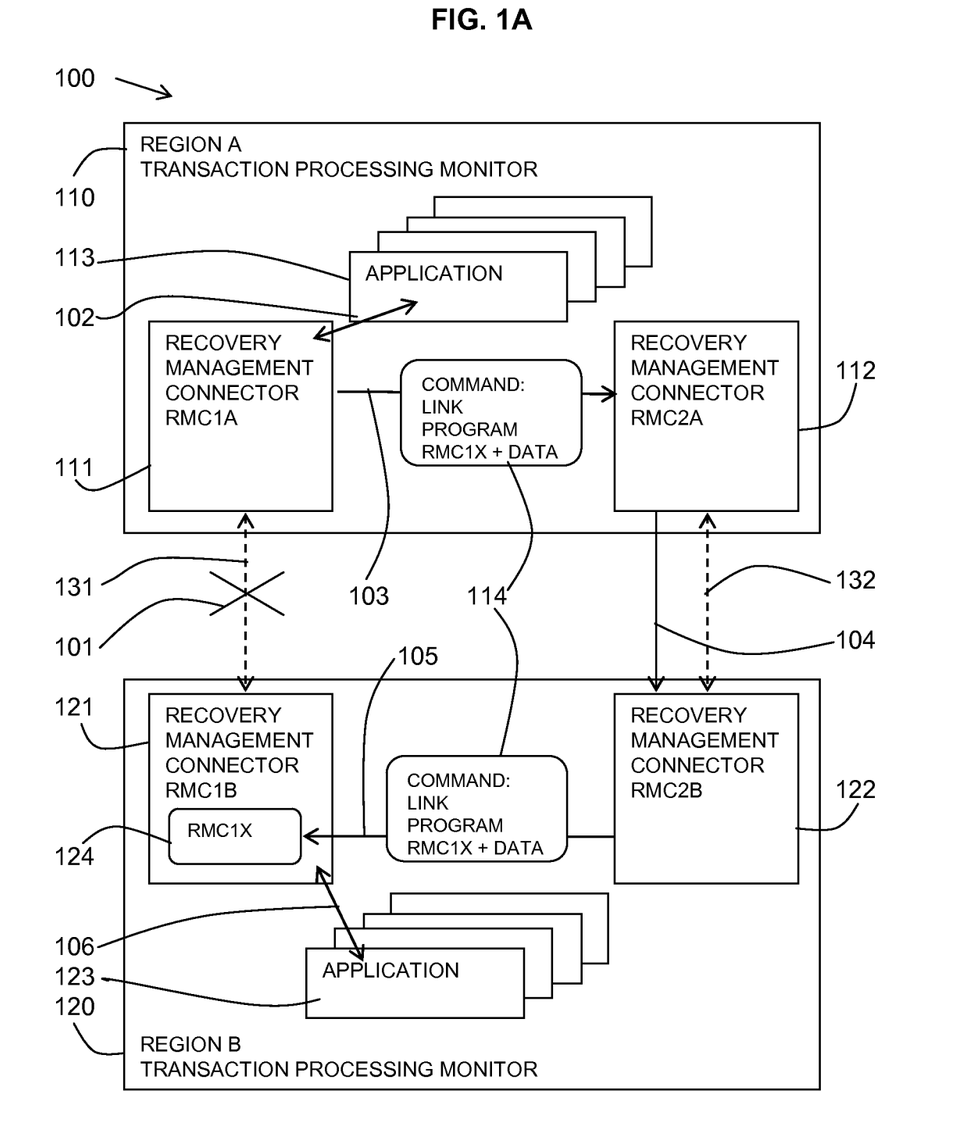
FIGS. 1A and 1B are block diagrams of an example embodiment of a system in accordance with the present disclosure showing two example method flows.
Figure 1B:
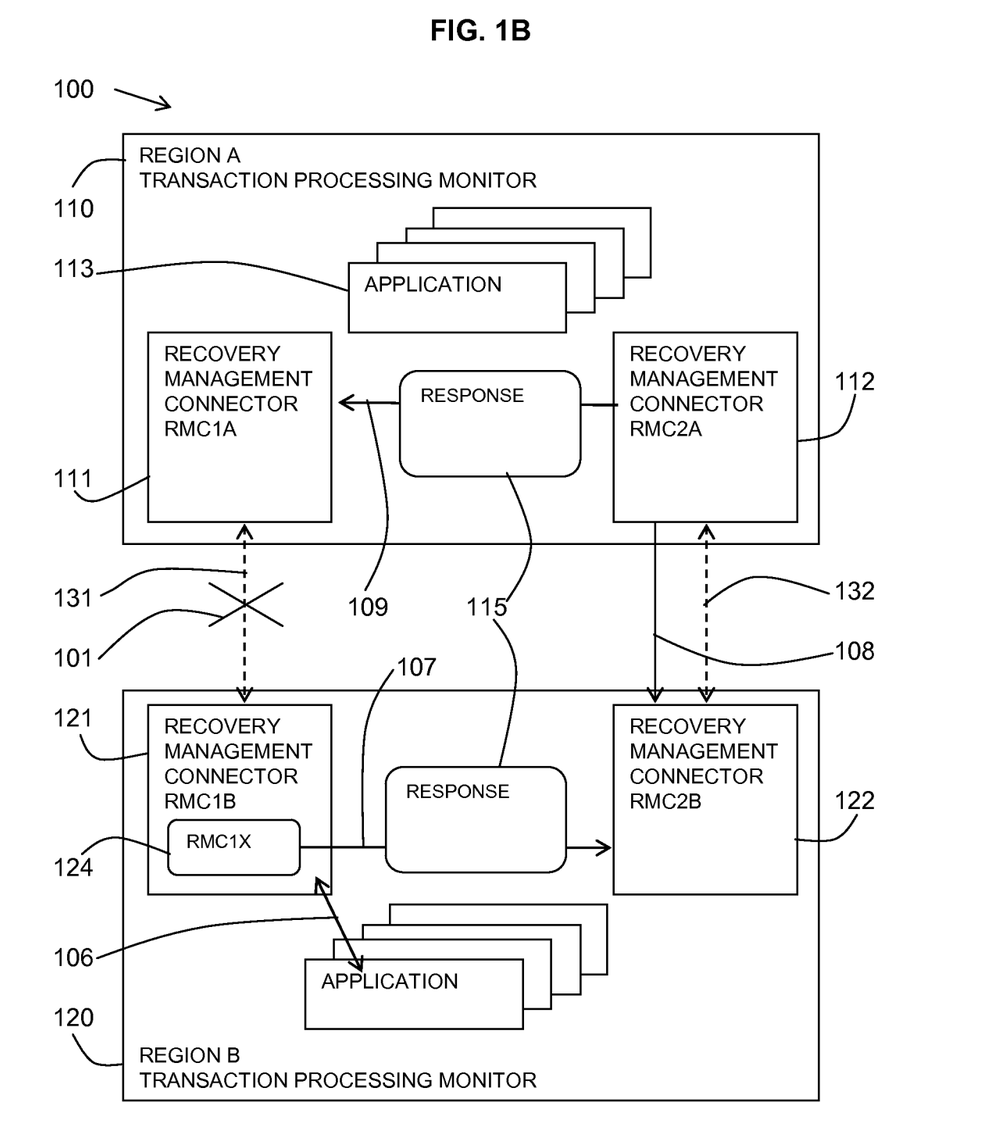

Referring to FIGS. 1A and 1B, block diagrams of system 100 are illustrated. Process flows are described with respect to system 100 illustrated in FIGS. 1A and 1B. A first transaction processing monitor 110 is provided for a first region 'A'. A second transaction processing monitor 120 is provided for a second partner region 'B'. The first transaction processing monitor 110 of region 'A' includes a first recovery management connector (RMC1A) 111 with a network connection 131 of a first type in communication with a first recovery management connector (RMC1B) 121 of the second transaction processing monitor 120 of region 'B'. The first transaction processing monitor 110 of region 'A' includes a second recovery management connector (RMC2A) 112 with a network connection 132 of a second type in communication with a second recovery management connector (RMC2B) 122 of the second transaction processing monitor 120 of region 'B'.

It should be appreciated that there may be additional recovery management connectors in each region's transaction processing monitor using additional network connection types. Referring to FIG. 1A, the first recovery management connector (RMC1A) 111 of region 'A' may service a number of requests from user applications 113 through the first type network connection 131 to the corresponding first recovery management connector (RMC1B) 121 in region 'B'. The first type network connection 131 may fail 101 for some reason. The first recovery management connector (RMC1A) 111 may query the connections defined to the transaction processing monitor 110 of region 'A' and may identify the second recovery management connector (RMC2A) 112 which has a network connection 132 of a second type. The transaction processing monitor 110 has knowledge of the resources that are available to it, including the set of connections that have been defined to it.

A component, such as an RMC can access information on other RMCs and the connections that they manage, by the use of internal interfaces built into a transaction processing monitor. As such, an RMC that has a failed connection can interrogate a system as a whole to determine whether there is another active connection that it could make use of. For example, the first recovery management connector (RMC1A) 111 may collect 102 relevant synchronization data from the user applications 113 that were making requests through it for users task when a connection failed. The first recovery management connector (RMC1A) 111 may collect the synchronization data from each user application 113 for user tasks which were active at the time of the connection failure and issues 103 an API command 114 to link to a specific program (RMC1X) 124 in the partner region 'B', passing the collected data as part of the command 114.

The command 114 may then be processed by the second recovery management controller (RMC2A) 112, which packages the command 114 (using a message protocol it supports for its connection 132 to region 'B') and transmits 104 the packaged command to a corresponding second recovery management connector (RMC2B) 122 in region 'B'. The message may arrive in region 'B' and the second recovery management system (RMC2B) 122 in region 'B' may extract the command and its data from the message and issue 105 the command 114 in region 'B'. The specific program (RMC1X) 124 named by the command 114 may be a component of the first recovery management connector (RMC1B) 121 of region 'B'. The specific program (RMC1X) 124 may run and use the data from the command to locate 106 state information about the relevant user task in the corresponding user applications 123 in region 'B'.

The specific program (RMC1X) 124 is a program that an RMC provides that can be invoked via an alternative connection and receive data that only RMCs of the same type understand. The message that passes over the alternative network comprises some information that tells the recipient what to do with it. In this case it is the name of the program (RMC1X). Once this program starts to execute the program can access the services of its RMC to complete the operations described by the data it has been passed. The program (RMC1X) 124 may combine the state information with the synchronization state information from the command's data to determine what needs to be done to continue the synchronization operation for an associated task. This then allows it to compete part or all of the outstanding synchronization operations.

Referring to FIG. 1B, the program (RMC1X) 124 may then build a response 115 to the command 114. The response 115 may be sent 107 to the second recovery management connector (RMC2B) 122 in region 'B' which packages it in the required protocol for the connection 132 with region 'A' and sends 108 it back as a message through the alternative network connection 132 to region 'A'. The message arrives at the second recovery management connector (RMC2A) 112 of region 'A' and may be extracted and delivered 109 to the first recovery management connector (RMC1A) 111 of region 'A'. The first recovery management connector (RMC1A) 111 of region 'A' may then use the response 115 to complete the current section of the synchronization operation for the user task at its end of the connection. The user task may then terminate or continue with the next part of the synchronization operation until updates in both regions are completed in step with each other.

Figure 2A:
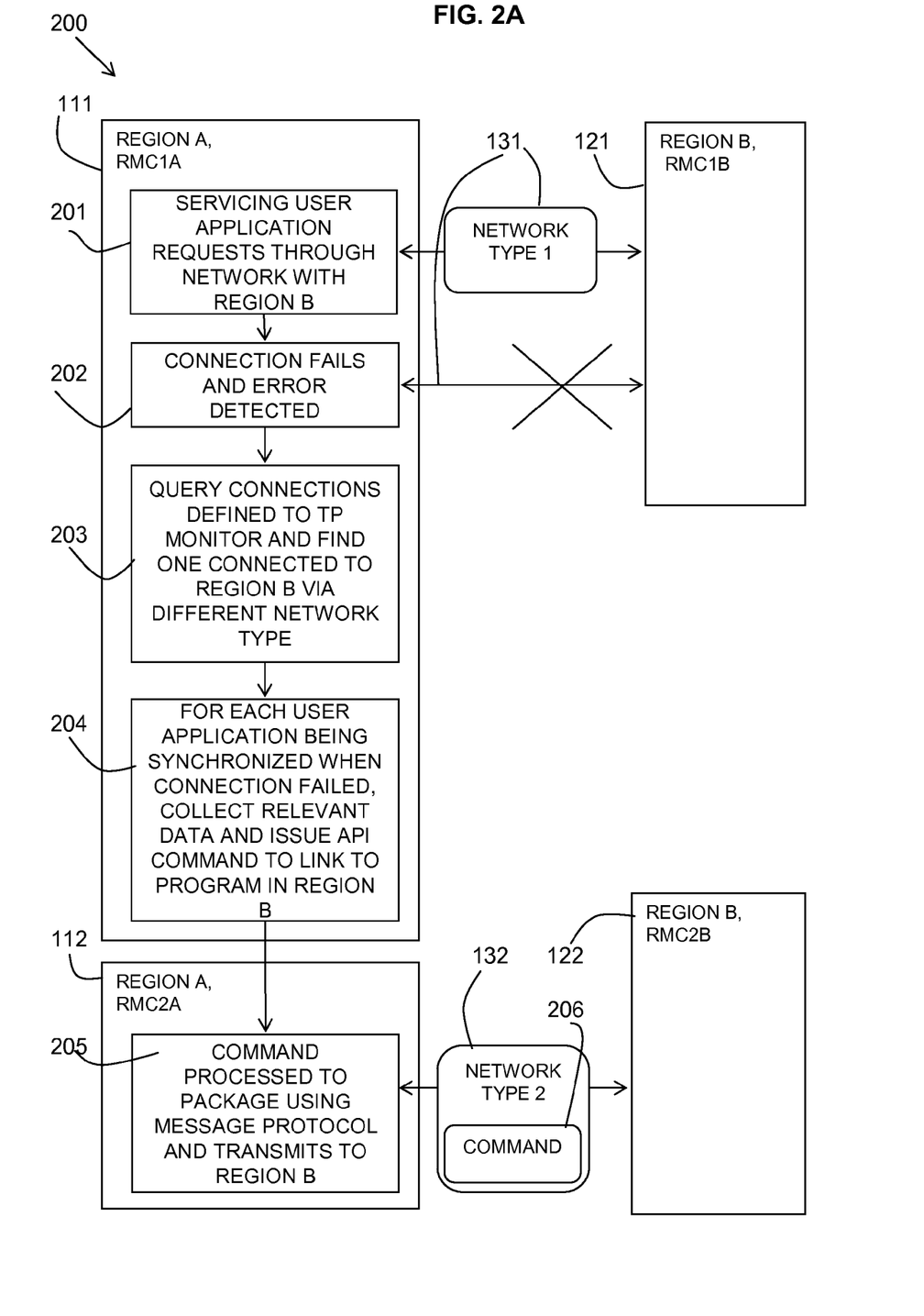
FIGS. 2A and 2B are flow diagrams of example embodiments of a method in accordance with the present disclosure.
Figure 2B:
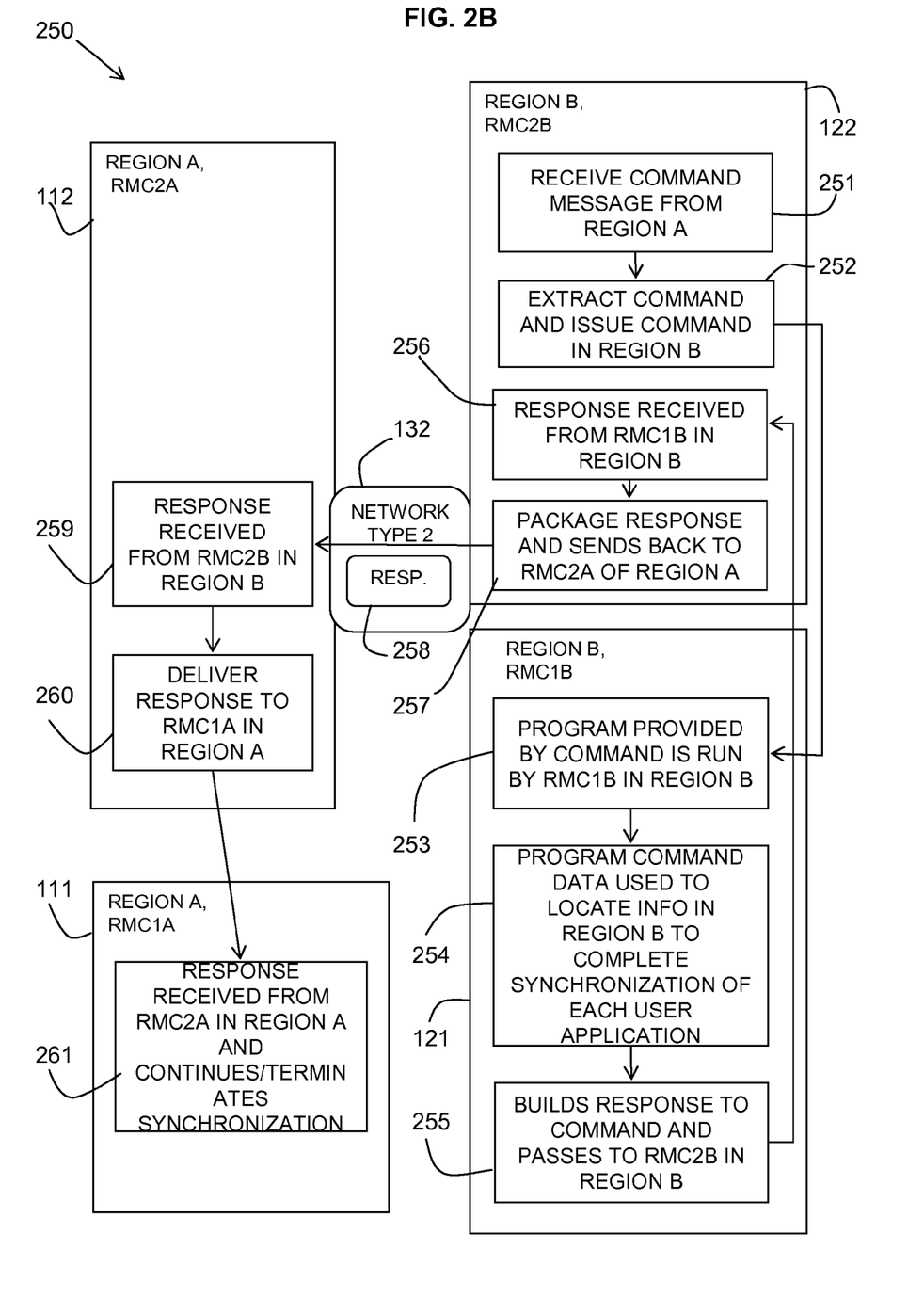

With reference to the following FIGS. 2A and 2B a sequence of operations are described that take place for one user application that has commenced a synchronization operation during which a connection it is using fails. Referring to FIG. 2A, a flow diagram 200 shows example embodiments of implemented processes at the RMCs in the two regions across which synchronization is taking place. Region 'A' has RMC1A 111, which may be servicing 201 a number of user application requests through a particular network 131 to region 'B'. The connection may fail 202 and RMC1A 111 in region 'A' may be notified or may detect the error (the RMC1B 112 in region 'B' may also become aware of the connection failure). RMC1A 111 may be notified that synchronization messages that it is trying to transmit or waiting to receive cannot be processed.

In region 'A', RMC1A 111 may then query 203 the connections that are defined to its transaction processing monitor and may find one that is still connected to region 'B' via a different network type. This connection is shown using RMC2A 112. RMC1A 111 may be in the middle of synchronizing one or more of the user applications that have been making requests through it. For each of these, RMC1A 111 may collect 204 relevant synchronization data (for example, a user task identifier and a synchronization state), and issue an API command to link to a specific program in the partner region 'B', passing the data as part of the command. The command may be processed by RMC2A 112, which packages 205 it up using the message protocol it supports and transmits 206 it through its network connection 132.

Referring to FIG. 2B, a flow diagram 250 shows the continued example process at the RMCs in the two regions. In region 'B', RMC2B 122 may receive 251 the command message from region 'A', as transmitted in block 206 of FIG. 2A. RMC2B 122 may extract 252 the command from the received package and issue the command in region 'B'. The program, named by the command (RMC1X) may be a component of RMC1B 121 in region 'B'. The program may run 253 and use the task identifier from the command data to locate 254 state information about the relevant user task in region 'B'. The program may then combine this information with the synchronization state information from the command's data, to determine what needs to be done to continue the synchronization operation for an associated task. This then allows it to complete part or all of the outstanding synchronization operation. The program may then build 255 a response to the command and pass the response back to RMC2B 122.

RMC2B 122 may receive 256 the response from RMC21 121 and package 257 the response and send 258 it back through the alternative network 132 to region 'A'. The message may arrive 259 at RMC2A in region 'A' and the response may be delivered 260 to RMC1A, which may then use 261 it to complete the current section of synchronization operation for the user task at its end of the connection. The user task may then terminate or continue with the next part of the synchronization operation until the updates in both regions are completed in step with each other.

OLTP monitors typically provide a unique identifier for each of the user tasks that they are managing. When a task issues a command that is then serviced over a network connection by another OLTP monitor, the identifier becomes associated with the new task that runs in the remote OLTP monitor to process the command. The identifier may be included in the command data for the operations described above. In addition to this, the OLTP monitor may keep track of the state of any synchronization operations that it is carrying out for a particular task, and that information may be available to the RMC associated with the actions of a particular task that is using a connection that the RMC then manages. Many OLTP monitors carry out synchronization operations in two phases and when they do they therefore require several synchronization messages to be flowed before the operation is completed.

The disclosed process supports the transmission of such a message sequence by permitting the code in an RMC to issue a sequence of commands each containing the data relating to a particular phase in the process. It is possible that RMCs in each region could be informed of a failure of the connection they are sharing at roughly the same time, and so processing may then get driven from either of them that could result in the arrival of a command in one region for a synchronization operation that was already being handled. Race conditions may be handled by failing one request while permitting the other to succeed, based on a factor such as preference being given to the region that had started the synchronization sequence. The solution outlined in this description is based on additional processing that takes place in the application layer of one protocol stack. The disclosed process reacts to a connection error and makes direct use of information relating to the connection resource that the user task has been using, while avoiding the additional complexities of having to deal with the message formatting that relates to the protocol of the network connection that has failed.

Figure 3:
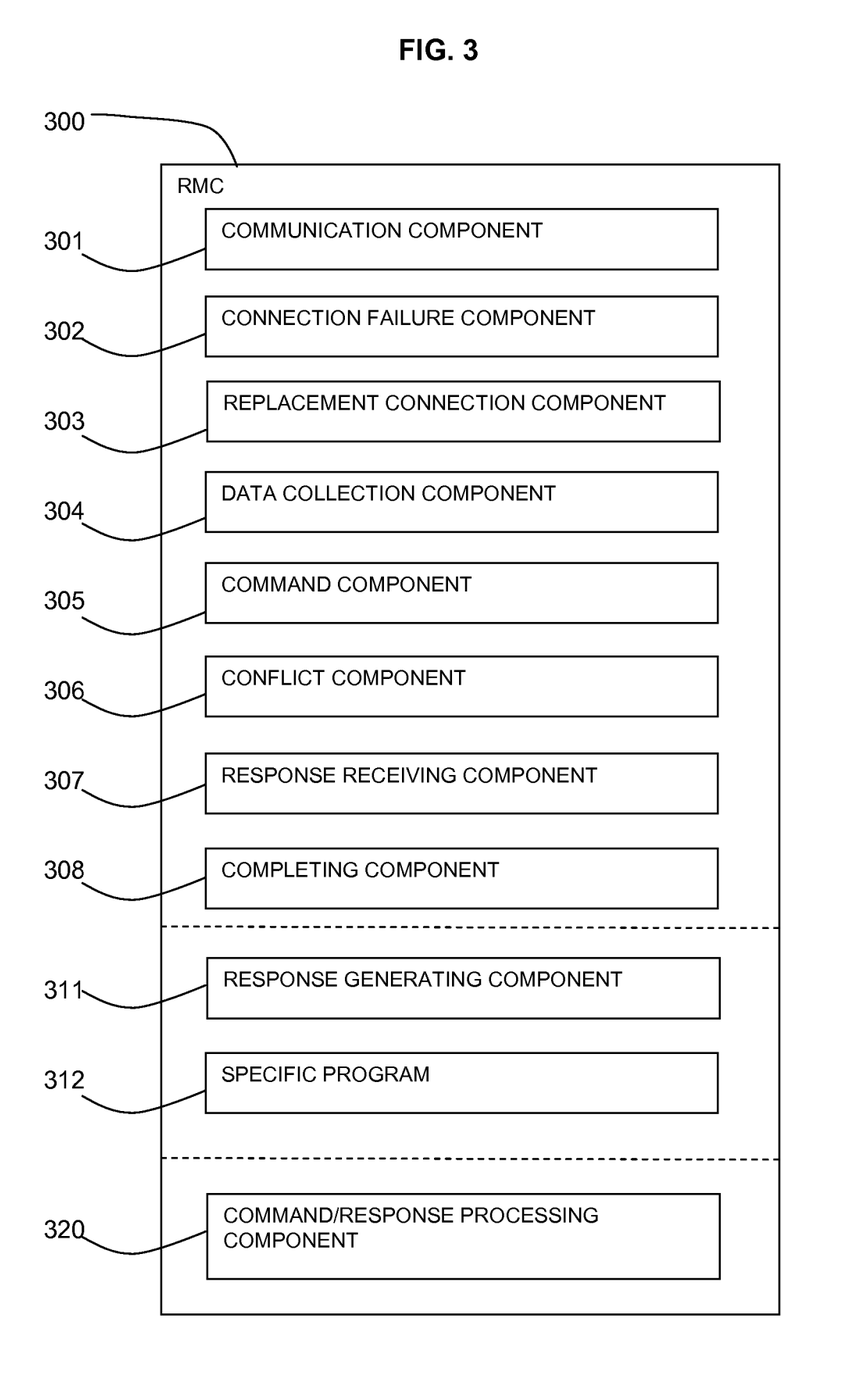
FIG. 3 is a block diagram of components of a system in accordance with the present disclosure.

Referring to FIG. 3, a block diagram 300 shows an RMC with the described functionality to carry out any of the operations of the various described RMC roles in each region. In other words, an RMC may act as any one of RMC1A, RMC1B, RMC2A, RMC2B. The RMC 300 may include a communication component 301 that uses a network protocol for communication with other regions across which synchronization is carried out. The RMC 300 in the role of the disconnected RMC in the middle of carrying out user tasks may include the various described components. A connection failure component 302 may be provided for identifying a failure of a network connection. A replacement network connection component 303 may be provided for querying connections defined in a region to identify a replacement network connection that is connected to a required region via a different network type to the failed network connection. A data collection component 304 may be provided for collecting relevant data for an interrupted synchronization operation from user applications including a user task identifier and synchronization state. A command component 305 may be provided for issuing an API command to link to a specific program 312 in another RMC in a partner region and passing the collected data as part of the command. A conflict component 306 may be provided for resolving a conflict between RMCs when multiple RMCs initiate recovery processes and issue commands when a connection between them fails. A response receiving component 307 may be provided for receiving a response to a command and a completing component 308 may use the response to finalize a synchronization operation.

An RMC 300 may also have additional functionality for when it is in the role of the RMC whose connection has been broken in the partner region. For example, RMC 300 may include a response generating component 311 (for generating a response to a received command) and a specific program 312 (for carrying out a received command). An RMC 300, when it is in the role of a forwarding RMC using an alternative network connection, may also include a command/response processing component 320 for receiving a command or response from another RMC in the same region and packaging or extracting it using the protocol of the network connection it uses.

Figure 4:
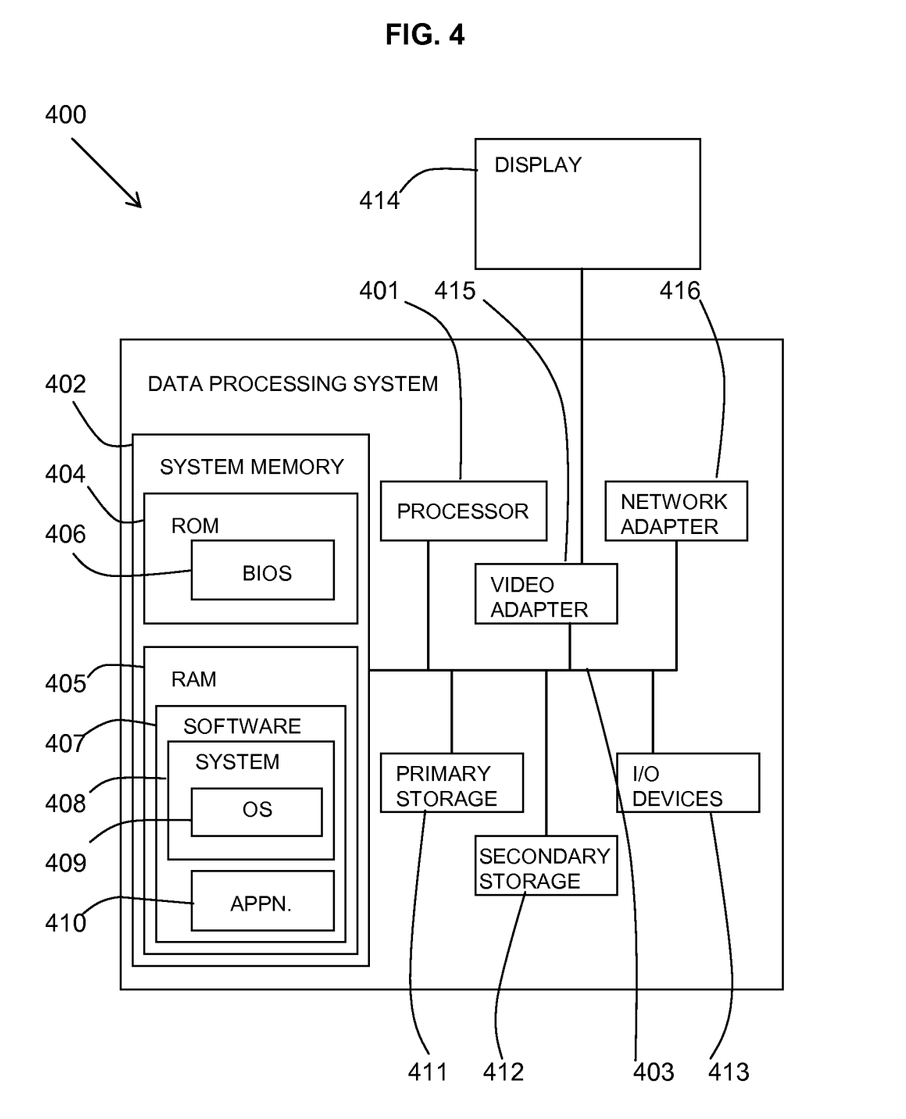
FIG. 4 is a block diagram of an embodiment of a computer system in which the present disclosure may be implemented.

Referring to FIG. 4, an exemplary system for implementing aspects of the disclosure includes a data processing system 400 suitable for storing and/or executing program code including at least one processor 401 coupled directly or indirectly to memory elements through a bus system 403. The memory elements may include local memory employed during actual execution of the program code, bulk storage, and cache memories which provide temporary storage of at least some program code in order to reduce the number of times code must be retrieved from bulk storage during execution. The memory elements may include system memory 402 in the form of read only memory (ROM) 404 and random access memory (RAM) 405. A basic input/output system (BIOS) 406 may be stored in ROM 404.

System software 407 may be stored in RAM 405 including operating system software 408. Software applications 410 may also be stored in RAM 405. The system 400 may also include a primary storage 411 such as a magnetic hard disk drive and secondary storage 412 such as a magnetic disc drive and an optical disc drive. The drives and their associated computer-readable media provide non-volatile storage of computer-executable instructions, data structures, program modules and other data for the system 400. Software applications may be stored on the primary and secondary storage 411, 412 as well as the system memory 402. The computing system 400 may operate in a networked environment using logical connections to one or more remote computers via a network adapter 416. Input/output devices 413 may be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

Accordingly, techniques have been disclosed herein that advantageously synchronize operations between regions when a network connection fails.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for synchronizing operations in a transaction processing system including first and second recovery management connectors in a first region, the method comprising:
   identifying, by the first recovery management connector, a failure of a first network connection having a first network type during synchronization operations with a partner region;
   querying, by the first recovery management connector, connections defined to the transaction processing system to identify a replacement network connection that is connected to the partner region using a second network type that is different than the first network type, the replacement network connection utilizing the second recovery management connector;
   collecting, by the first recovery management connector, relevant data for an interrupted synchronization operation;
   issuing, by the first recovery management connector, a command to link to a specific program that is a component of a first recovery management connector in the partner region, the command including the relevant data for the interrupted synchronization operation, wherein the specific program is configured to use the relevant data from the command to locate state information on a relevant user task in a corresponding user application in the partner region and continue the interrupted synchronization operation such that associated resources are unlocked; and
   communicating, using the second recovery management connector, the command to and receiving a response from the partner region via the replacement network connection in order to continue the interrupted synchronization operation.

2. The method of claim 1, further comprising:
   packaging, using the second recovery management connector, the command in a protocol of the second network type at an application layer; and
   transmitting, using the second recovery management connector, the packaged command to the partner region using the replacement network connection.

3. The method of claim 2, further comprising:
   receiving, using a second recovery management connector in the partner region, the packaged command; and
   extracting and issuing, using the second recovery management connector in the partner region, the command in the partner region.

4. The method of claim 3, further comprising:
   running, using the first recovery management connector in the partner region, the specific program linked to by the command;
   locating, using the first recovery management connector in the partner region, state information about the synchronization operation in the partner region using the relevant data for the interrupted synchronization operation;
   combining, using the first recovery management connector in the partner region, the received relevant data and the state information in the partner region to determine how to continue the synchronization operation; and
   building, using the first recovery management connector in the partner region, a response to the command.

5. The method of claim 4, further comprising:
   packaging, using the second recovery management connector in the partner region, the response in the protocol of the second network type; and
   transmitting, using the second recovery management connector in the partner region, the packaged response to the first region using the replacement network connection.

6. The method of claim 5, further comprising:
   receiving, using the second recovery management connector in the first region, the packaged response; and
   extracting the response and delivering the extracted response to the first recovery management connector in the first region using the second recovery management connector in the first region.

7. The method of claim 6, further comprising:
   completing, using the first recovery management connector in the first region, a current section of the synchronization operation to ensure the first region and the partner region are synchronized.

8. The method of claim 1, wherein the relevant data includes a user task identifier and a synchronization state.

9. The method of claim 1, wherein the synchronization operation includes a message sequence and the command to link to a specific program includes a sequence of commands each containing data for a particular phase in the synchronization operation.

10. The method of claim 1, wherein the synchronization operation is servicing at least one user application and the relevant data is collected from one or more user applications.

11. The method of claim 1, wherein the first recovery management connector in the first region and the first recovery management connector in the partner region both identify a failure and issue respective commands for delivery via respective replacement network connections, and wherein one of the respective commands is failed based on a preference factor between the first region and the partner region.

12. A system for synchronizing operations in a transaction processing system, comprising:
   a first region of the transaction processing system including a first recovery management connector managing communications with a partner region using a first network connection having a first network type and a second recovery management connector managing communications with the partner region using a replacement network connection having a second network type, different from the first network type, wherein the first recovery management connector includes:
      a connection failure component configured to identify a failure of the first network connection during synchronization operations with the partner region;
      a replacement network connection component configured to query connections defined to the transaction processing system to identify the replacement network connection for the first network connection when the first network connection fails;

a data collection component configured to collect relevant data for an interrupted synchronization operation;

a command component configured to issue a command to link to a specific program that is a component of a first recovery management connector in the partner region, the command including the relevant data for the interrupted synchronization operation, wherein the specific program is configured to use the relevant data from the command to locate state information on a relevant user task in a corresponding user application in the partner region and continue the interrupted synchronization operation such that associated resources are unlocked; and the second recovery management connector including an associated communication component that communicates the command to and receives a response from the partner region via the replacement network connection in order to continue the interrupted synchronization operation.

13. The system of claim 12, wherein the second recovery management connector includes:

a command processing component configured to package the command in a protocol of the second network type at an application layer; and a communication component configured to transmit the packaged command to the partner region using the replacement network connection.

14. The system of claim 13, further comprising a second recovery management connector in the partner region that includes a communication component configured to receive the packaged command and extract the command and issue the command in the partner region.

15. The system of claim 14, wherein the first recovery management connector in the partner region includes:

a response generating component configured to locate state information about the synchronization operation in the partner region using the relevant data for the interrupted synchronization operation, combine the received relevant data and the state information in the partner region to determine how to continue the synchronization operation, and build a response to the command.

16. The system of claim 15, wherein the communication component of the second recovery management connector in the partner region is further configured to:

package the response in the protocol of the second network type; and transmit the packaged response to the first region using the replacement network connection.

17. The system of claim 16, wherein the communication component of the second recovery management connector in the first region is further configured to:

receive the packaged response; and extract the response and delivering it to the first recovery management connector in the first region.

18. The system of claim 17, wherein the first recovery management connector in the first region includes a completing component configured to complete a current section of the synchronization operation to ensure the first region and the partner region are synchronized.

19. The system of claim 12, wherein the relevant data includes a user task identifier and a synchronization state.

20. A computer program product for synchronizing operations in a transaction processing system, the computer program product comprising:

a computer-readable storage medium; and computer-readable program code embodied on the computer-readable storage device, wherein the computer-readable program code when executed by the transaction processing system is configured to cause the transaction processing system to:

identify, by a first recovery management connector of a first region, a failure of a first network connection having a first network type during synchronization operations between the first recovery management connector and a partner region;

query, by the first recovery management connector, connections defined to the transaction processing system to identify a replacement network connection in the first region that is connected to the partner region using a second network type that is different than the first network type, the replacement network connection utilizing a second recovery management connector of the first region;

collecting, by the first recovery management connector, relevant data for an interrupted synchronization operation;

issuing, by the first recovery management connector, a command to link to a specific program that is a component of a first recovery management connector in the partner region, the command including the relevant data for the interrupted synchronization operation, wherein the specific program is configured to use the relevant data from the command to locate state information on a relevant user task in a corresponding user application in the partner region and continue the interrupted synchronization operation such that associated resources are unlocked; and communicating, using the second recovery management connector, the command to and a response from the partner region via the replacement network connection in order to continue the interrupted synchronization operation.

* * * * *